United States Patent
Hsu et al.

(10) Patent No.: US 10,635,197 B2
(45) Date of Patent: Apr. 28, 2020

(54) LATERAL PRESSURE SENSING POINTER

(71) Applicant: SHENZHEN PU YING INNOVATION TECHNOLOGY CORP., LTD., Shenzhen (CN)

(72) Inventors: Chung-Wen Hsu, Shenzhen (CN); Chung-Hsuan Li, Shenzhen (CN)

(73) Assignee: SHENZHEN PU YING INNOVATION TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/372,987

(22) Filed: Apr. 2, 2019

(65) Prior Publication Data

US 2020/0050294 A1    Feb. 13, 2020

(30) Foreign Application Priority Data

Aug. 7, 2018 (CN) .......................... 2018 1 0889867

(51) Int. Cl.
| | |
|---|---|
| *G06F 3/033* | (2013.01) |
| *G06F 3/0354* | (2013.01) |
| *G06F 3/041* | (2006.01) |
| *G06F 3/044* | (2006.01) |

(52) U.S. Cl.
CPC .......... *G06F 3/03545* (2013.01); *G06F 3/044* (2013.01); *G06F 3/04144* (2019.05); *G06F 3/04162* (2019.05)

(58) Field of Classification Search
USPC ....... 345/179, 180, 150, 156, 158, 173, 174; 178/19.08; 604/136; 73/865.4; 324/662
See application file for complete search history.

(56) References Cited

U.S. PATENT DOCUMENTS

| | | | | |
|---|---|---|---|---|
| 6,930,959 B2* | 8/2005 | Narayanaswami | .... | G04G 21/00 200/14 |
| 2003/0105430 A1* | 6/2003 | Lavi | .................... | A61M 5/2033 604/136 |
| 2005/0030297 A1* | 2/2005 | Burstrom | ............ | G06F 3/03545 345/179 |
| 2008/0192028 A1* | 8/2008 | Burstrom | ............ | G06F 3/03545 345/179 |
| 2009/0076770 A1* | 3/2009 | Fukushima | ......... | G06F 3/03545 702/150 |
| 2010/0141580 A1* | 6/2010 | Oh | ........................ | G06F 3/0202 345/158 |

(Continued)

*Primary Examiner* — Thuy N Pardo
(74) *Attorney, Agent, or Firm* — Rabin & Berdo, P.C.

(57) ABSTRACT

A lateral pressure sensing pointer includes a housing, a cartridge, a lateral key, a first elastic member, a first pressure sensing element, and a second elastic member. The housing extends a length along an axial direction, and has an end opening, a lateral opening, and an accommodation space. The end opening and the lateral opening are respectively in communication with the accommodation space. The cartridge is disposed at the end opening. The lateral key is disposed at the lateral opening. One end of the first elastic member is combined with the lateral key and can provide an elastic force along a radial direction perpendicular to the axial direction. The first pressure sensing element is disposed inside the accommodation space and can sense a pressure applied along the radial direction. The second elastic member abuts against the lateral key and can provide an elastic force along the radial direction.

12 Claims, 4 Drawing Sheets

(56) References Cited

U.S. PATENT DOCUMENTS

| | | | | |
|---|---|---|---|---|
| 2011/0063241 A1* | 3/2011 | Oh | ................... | G06F 3/0338 |
| | | | | 345/173 |
| 2011/0192658 A1* | 8/2011 | Fukushima | ......... | G06F 3/03545 |
| | | | | 178/19.03 |
| 2011/0219892 A1* | 9/2011 | Fukushima | ......... | G06F 3/03545 |
| | | | | 73/865.4 |
| 2011/0241703 A1* | 10/2011 | Fukushima | .............. | H01G 5/16 |
| | | | | 324/662 |
| 2013/0314382 A1* | 11/2013 | Fukushima | ......... | G06F 3/03545 |
| | | | | 345/179 |
| 2017/0182258 A1* | 6/2017 | Michael | ............ | A61M 5/31568 |
| | | | | 345/179 |
| 2018/0101251 A1* | 4/2018 | Fujitsuka | ................ | G01L 1/148 |
| | | | | 345/179 |

\* cited by examiner

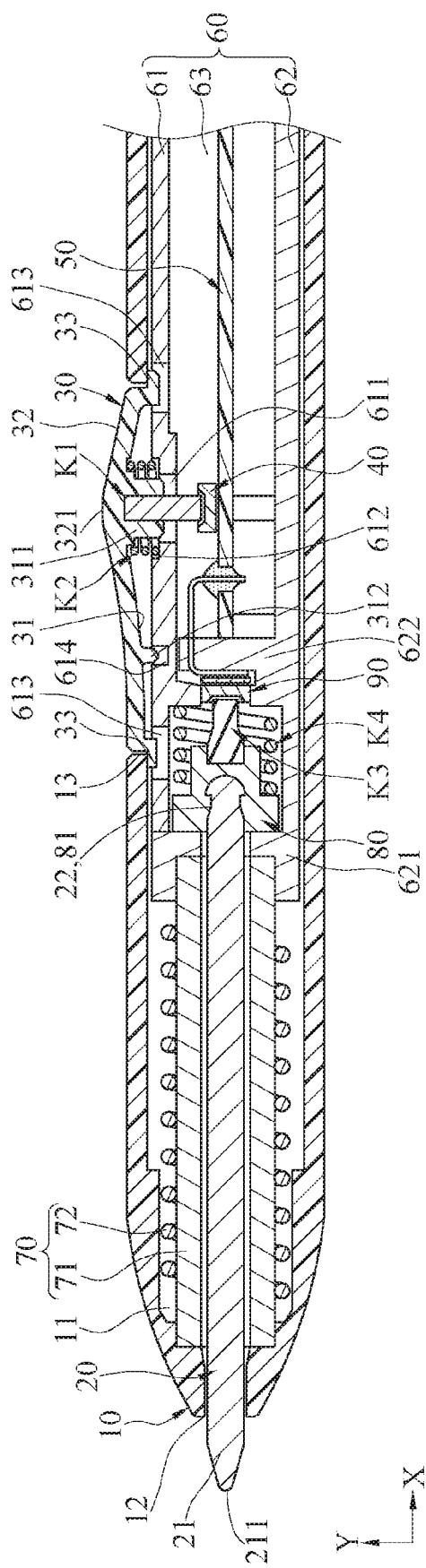
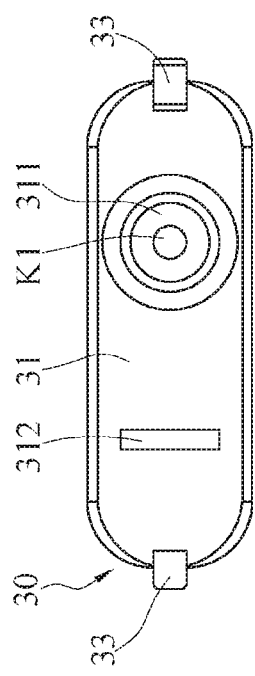
FIG. 1
FIG. 2

LATERAL PRESSURE SENSING POINTER

CROSS-REFERENCE TO RELATED APPLICATION

This non-provisional application claims priority under 35 U.S.C. § 119(a) to Patent Application No. 201810889867.5 filed in China, P.R.C. on Aug. 7, 2018, the entire contents of which are hereby incorporated by reference.

BACKGROUND

Technical Field

Embodiments of the present invention relate to a digital pointer, and in particular, to a lateral pressure sensing pointer controlled laterally.

Related Art

As science and technologies develop, more electronic apparatuses such as a smartphone, a tablet computer, or a personal digital assistant (PDA) use touch panels as operation interfaces, so that users perform an operation by touch to improve convenience. In addition, input (for example, writing or selecting by tapping) may be performed in cooperation with a stylus-type pointer, so that a touch panel is operated more quickly and precisely.

As digital functions are already not limited to common touch functions of writing or selecting by tapping and develop toward a trend of diversity, and use requirements are diverse, the applicant considers that it is indeed necessary to extend functions of a stylus-type pointer.

SUMMARY

The present invention provides a lateral pressure sensing pointer, including a housing, a cartridge, a lateral key, a first elastic member, a first pressure sensing element, and a second elastic member. The housing is a hollow structure that extends a length along an axial direction. The housing has an end opening, a lateral opening, and an accommodation space. The end opening and the lateral opening are respectively in communication with the accommodation space. The cartridge is disposed at the end opening. The lateral key is disposed at the lateral opening and has an inner surface and an outer surface that are opposite to each other. The inner surface faces the accommodation space. One end of the first elastic member is combined with the inner surface of the lateral key, and the first elastic member can provide an elastic force along a radial direction perpendicular to the axial direction. The first pressure sensing element is disposed inside the accommodation space and is opposite to the other end of the first elastic member, and the first pressure sensing element can sense a pressure applied along the radial direction. The second elastic member abuts against the inner surface of the lateral key and can provide an elastic force along the radial direction.

BRIEF DESCRIPTION OF THE DRAWINGS

The present invention will become more fully understood from the detailed description given Herein below for illustration only, and thus are not limitative of the present invention, and wherein:

FIG. 1 is a schematic diagram of an embodiment of a lateral pressure sensing pointer according to the present invention;

FIG. 2 is a schematic diagram of a lateral key in the embodiment in FIG. 1;

DETAILED DESCRIPTION

Figure 3:
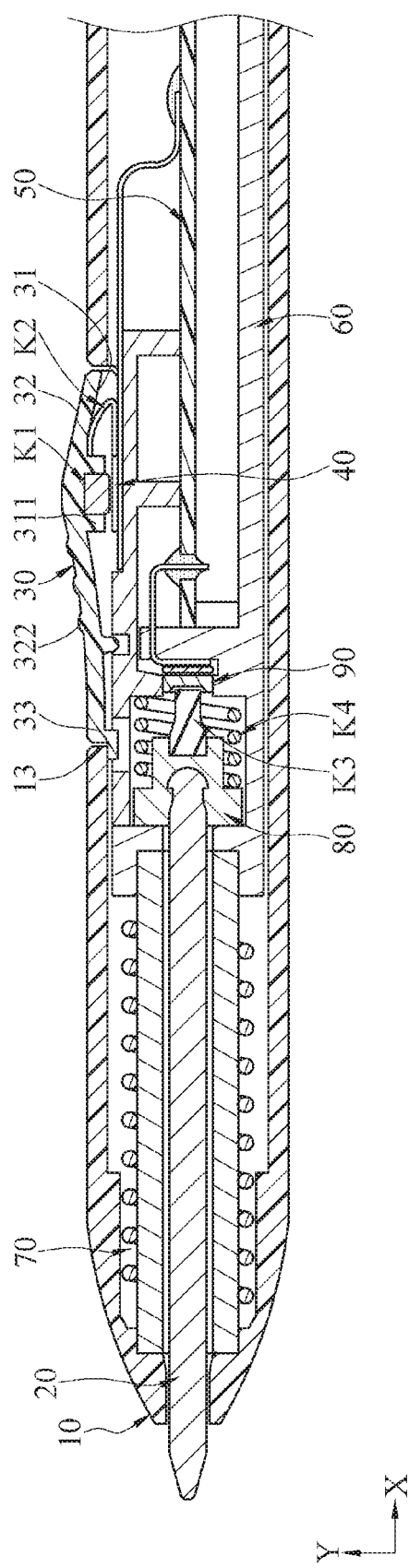
FIG. 3 is a schematic diagram of another embodiment of a lateral pressure sensing pointer according to the present invention.

Referring to FIG. 1, FIG. 1 is a schematic diagram of an embodiment of a lateral pressure sensing pointer according to the present invention. Herein, the lateral pressure sensing pointer is a passive or active electromagnetic sensing pointer used in cooperation with a digitizer tablet to display a location and a pressure of the pointer as virtual handwriting on the digitizer tablet.

The lateral pressure sensing pointer shown in FIG. 1 includes a housing 10, a cartridge 20, a lateral key 30, a first elastic member K1, a first pressure sensing element 40, and a second elastic member K2.

Referring to FIG. 1, the cartridge 20 is disposed at an end opening 12 of the housing 10 in an axial direction X to indicate a location. The lateral key 30 is disposed on a periphery side of the housing 10 for a user to press. The first pressure sensing element 40 is disposed in the housing 10 to sense a pressure in a radial direction Y perpendicular to the axial direction X. The first elastic member K1 is disposed at a corresponding position on an inner surface that is of the lateral key 30 and that faces the first pressure sensing element 40. The second elastic member K2 abuts against the inner surface of the lateral key 30 and provides an elastic force along the radial direction Y, and the second elastic member K2 and the first elastic member K1 are located at coaxial positions.

In this way, a user may operate the lateral pressure sensing pointer by lateral pressing, the lateral key 30 transfers a pressure to the first pressure sensing element 40 by using the first elastic member K1, and the first pressure sensing element 40 senses the pressure to convert the pressure of the lateral operation to a mark for display. The second elastic member K2 can push the lateral key 30 to an initial position after each pressing operation is completed, to facilitate a next operation. It should be noted that the mark may be virtual handwriting of a hard-tipped pen, a fountain pen, a writing brush, or another different type of pen, or a spray paint mark of virtual spray paint.

It should be noted that the pressure in the radial direction Y sensed by the first pressure sensing element 40 may be a force applied along the radial direction Y or a force having a force component in the radial direction Y.

Still referring to FIG. 1, the housing 10 is a hollow stylus-type strip-shaped housing that extends a length along the axial direction X, but is not limited thereto. A hollow cavity surrounded by the housing 10 is an accommodation space 11. In an embodiment, one end of the housing 10 is open and the other end of the housing 10 is closed, but this is not limited thereto. Further, the housing 10 has the end opening 12 and a lateral opening 13. The end opening 12 is open at one end of the housing 10 in the axial direction X, an open direction of the lateral opening 13 is different from that of the end opening 12, and the end opening 12 and the lateral opening 13 of the housing 10 are respectively in communication with the accommodation space 11.

Still referring to FIG. 1, the cartridge 20 is disposed at the end opening 12 of the housing 10 and extends into the accommodation space 11 of the housing 10. Herein, the cartridge 20 is a long-rod structure and one end of the cartridge 20 is a nib end 21, and the nib end 21 has a tapered tip contact surface 211. The nib end 21 of the cartridge 20 extends outward from the end opening 12, and is configured to touch or write by using the tip contact surface 211.

Referring to FIG. 1, in an embodiment, the lateral key 30 is a non-planar sheet structure. The lateral key 30 has an inner surface 31 and an outer surface 32 that are opposite to each other, and the lateral key 30 is disposed at the lateral opening 13 of the housing 10 and the inner surface 31 faces the accommodation space 11. Specifically, the outer surface 32 of the lateral key 30 is a non-planar structure has a sleek cone shape. Herein, the outer surface 32 of the lateral key 30 has a vertex 321, and the vertex 321 of the lateral key 30 and two ends of the lateral key 30 are not coplanar in the radial direction Y. In an embodiment, the vertex 321 of the lateral key 30 protrudes relative to the two ends of the lateral key 30.

Referring to FIG. 1, one end of the first elastic member K1 is combined with the inner surface 31 of the lateral key 30. When the other end of the first elastic member K1 is pressed, an elastic force in the radial direction Y can be provided to the lateral key 30. The first elastic member K1 may be a block, a sheet, or a spring made of an elastic material. The elastic material may be silica gel or rubber, but is not limited thereto. Herein, the first elastic member K1 is a cylindrical rubber block having elastic resilience.

The first pressure sensing element 40 may implement capacitive pressure sensing, piezoelectric pressure sensing, or piezoresistive pressure sensing, but is not limited thereto. The first pressure sensing element 40 is fastened in the accommodation space 11 of the housing 10, and a position of the first pressure sensing element 40 corresponds to a position of the other end of the first elastic member K1. In this way, the lateral key 30 can abut against the first pressure sensing element 40 by using the first elastic member K1, and the first pressure sensing element 40 can sense a pressure applied to the lateral key 30 and convert, by using a signal operation, the pressure to an analog mark that can display a pressure change.

Further referring to FIG. 1, one end of the second elastic member K2 abuts against the inner surface 31 of the lateral key 30 and can provide an elastic force in the radial direction Y to the lateral key 30. Herein, the other end of the second elastic member K2 is fastened in the accommodation space 11. Further, in an embodiment, the second elastic member K2 is a circular spring, and the second elastic member K2 and the first elastic member K1 are located at coaxial positions, but this is not limited thereto. Herein, the first elastic member K1 falls within a range of surrounding of the second elastic member K2.

Referring to FIG. 1, in this embodiment, extending directions of center axes of the first elastic member K1 and the second elastic member K2 pass through the vertex 321 of the lateral key 30. In this way, because the vertex 321 of the lateral key 30 protrudes relative to the two ends of the lateral key 30, the vertex 321 of the lateral key 30 is a position that is touched by a user intuitively when the user performs an operation laterally. Based on this, when the user applies a force from the vertex 321 of the lateral key 30, the applied force of the user can be directly applied to the extending directions of the center axes of the first elastic member K1 and the second elastic member K2. In this way, the first elastic member K1 and the second elastic member K2 may deform from positions of the center axes of the first elastic member K1 and the second elastic member K2 when bearing the force. That is, deformations of the first elastic member K1 and the second elastic member K2 do not incline to one side, to ensure that there is no operation handfeel that the lateral key 30 inclines, and improve comfort of operation handfeel.

Referring to FIG. 1, herein, an annular protruding base 311 is further included at a position that is on the inner surface 31 of the lateral key 30 and that corresponds to the vertex 321. The center axis of the protruding base 311 passes through the vertex 321 of the lateral key 30. The first elastic member K1 is inserted into the protruding base 311, and the second elastic member K2 is sleeved over the protruding base 311, so that the first elastic member K1 and the second elastic member K2 are stably disposed on the lateral key 30.

Referring to FIG. 1, specifically, in an embodiment, the lateral pressure sensing pointer further includes a circuit unit 50. The circuit unit 50 is accommodated in the accommodation space 11. Herein, the circuit unit 50 may be fastened in the accommodation space 11. In this embodiment, the first pressure sensing element 40 is electrically connected to the circuit unit 50. The circuit unit 50 receives a signal of the first pressure sensing element 40 and can perform operation processing to convert the signal measured by the first pressure sensing element 40 to a mark for display.

Based on the foregoing, a user holds the housing 10 and presses the lateral key 30 to perform digital marking. When a user applies a pressure to the lateral key 30, the lateral key 30 applies a pressure to the first elastic member K1 and the second elastic member K2, and the first elastic member K1 and the second elastic member K2 are pressed and accumulate an elastic force. When a pressure continues to be applied to the lateral key 30, the first elastic member K1 is displaced with the lateral key 30 and gradually approaches the first pressure sensing element 40. The first elastic member K1 can abut against the first pressure sensing element 40 when being continuously displaced. The first pressure sensing element 40 is pressed and senses a pressure value, and converts a pressure signal to a corresponding digital mark by using the circuit unit 50.

Further, referring to FIG. 1, there may be a micro gap close to zero between the first elastic member K1 and the first pressure sensing element 40. Specifically, the micro gap between the first pressure sensing element 40 and the first elastic member K1 refers to a gap between the first pressure sensing element 40 and the first elastic member K1 when the lateral key 30 does not bear a force. Based on this, the micro gap close to zero ensures that there is no force between the lateral key 30 and the first pressure sensing element 40 when the lateral key 30 does not bear a force, to prevent the first pressure sensing element 40 from being pressed in a normal state, thereby increasing a service life of the first pressure sensing element 40.

More specifically, referring to FIG. 1, an inner fastening unit 60 is further included. The inner fastening unit 60 is fastened in the accommodation space 11 to bear inner components of a lateral pressure sensing pointer to improve structural stability. Herein, the inner fastening unit 60 includes a first support member 61 and a second support member 62. The first support member 61 and the second support member 62 may butt to delimit an inner cavity 63, the circuit unit 50 is fastened to the inner cavity 63, and the first pressure sensing element 40 is fastened to the circuit unit 50.

In addition, referring to FIG. 1, the first support member 61 of the inner fastening unit 60 has an operation opening 611 in communication with the inner cavity 63, and a position of the operation opening 611 corresponds to a position of the lateral opening 13 of the housing 10 and positions of the first pressure sensing element 40 and the first elastic member K1. In this way, when the lateral key 30 is disposed at the lateral opening 13 of the housing 10, the first elastic member K1 may extend into the inner cavity 63 from the operation opening 611 along the radial direction Y to abut against the first pressure sensing element 40. An annular groove 612 may be further provided on the peripheral edge of the operation opening 611 of the first support member 61 and on a side of the first support member 61 facing the lateral key 30. One end of the second elastic member K2 abuts against the inner surface 31 of the lateral key 30, and the other end of the second elastic member K2 may abut against the annular groove 612. In this way, components inside the lateral pressure sensing pointer can be located at stable positions.

Further, referring to both FIG. 2 and FIG. 1, in an embodiment, a peripheral outline of the lateral key 30 is in the shape of a track and has a long side and a short side. Stoppers 33 are further respectively included at peripheries of two ends of the long side of the lateral key 30, and a distance of the longest connection line between the stoppers 33 is greater than a distance of the longest connection line of the outline of the lateral opening 13 of the housing 10. In this way, the lateral key 30 may be disposed outward from an inner side of the housing 10. After the lateral key 30 is disposed at the lateral opening 13, the stoppers 33 of the lateral key 30 can be limited by the lateral opening 13 to prevent the lateral key 30 from dislocating.

In addition, referring to FIG. 1, in this embodiment, a position that is on the first support member 61 and that corresponds to the stopper 33 may be further provided with a through opening 613 that passes therethrough. The through opening 613 provides a displacement space in which the stopper 33 is displaced along the radial direction Y on the lateral key 30, so that a displacement path of the lateral key 30 can extend into the inner fastening unit 60 in the housing 10. In this way, although the first support member 61 is disposed, a position of the lateral key 30 does not obviously protrude from the housing 10, thereby reducing the volume of the housing 10.

Further, referring to FIG. 1 and FIG. 2, a protruding portion 312 is further disposed on the inner surface 31 of the lateral key 30, and the protruding portion 312 traverses a short side of the inner surface 31 of the lateral key 30. That is, a position of the protruding portion 312 is located between the two stoppers 33 of the lateral key 30. Herein, a groove 614 is provided at a position that is on the first support member 61 and that corresponds to the protruding portion 312. In this way, the protruding portion 312 of the lateral key 30 can be limited by the groove 614 of the first support member 61, to limit a distance by which the lateral key 30 is displaced into the housing 10, thereby preventing using from being affected because the lateral key 30 is excessively recessed toward the housing 10.

Similarly, referring to FIG. 1, in an embodiment, the lateral pressure sensing pointer may further have a pointer function of writing in the axial direction X. Herein, an electromagnetic unit 70, an abutting member 80, a second pressure sensing element 90, a third elastic member K3, and a fourth elastic member K4 are further included.

In this embodiment, coupling electromagnetic energy is sensed between the electromagnetic unit 70 and a digitizer tablet, and a position of the cartridge 20 is calculated by electromagnetic exchange to display virtual handwriting. Referring to FIG. 1, the cartridge 20 is connected to the abutting member 80, the abutting member 80 is connected to the third elastic member K3, the fourth elastic member K4 abuts against the abutting member 80, and the second pressure sensing element 90 is located at a position facing the third elastic member K3. In this way, when the cartridge 20 is pressed, the abutting member 80 drives the third elastic member K3 to abut against the second pressure sensing element 90 to sense that the cartridge 20 is pressed, to display a pen stroke pressure on the virtual handwriting, so that displayed handwriting is closer to actual pen strokes. The fourth elastic member K4 resets the cartridge 20 when a pressure on the cartridge 20 disappears, to implement sensing next time.

Further, there may also be a micro gap close to zero between the third elastic member K3 and the second pressure sensing element 90, so that the second pressure sensing element 90 can provide a complete pressure sensing range and have a longer service life.

Referring to FIG. 1, the electromagnetic unit 70 is accommodated in the accommodation space 11, the electromagnetic unit 70 includes a magnet 71 and a coil 72, and the coil 72 is wound outside the magnet 71 and can be connected to the circuit unit 50 by using a conductor. Herein, the magnet 71 is in the shape of a hollow cylinder, but is not limited thereto. Herein, a position of the electromagnetic unit 70 in the accommodation space 11 is close to the end opening 12 relative to the inner fastening unit 60. Specifically, two ends of the magnet 71 abut against the housing 10 and the second support member 62 respectively to be located in the housing 10.

Referring to FIG. 1, the other end of the cartridge 20 is a combination end 22, and the combination end 22 of the cartridge 20 passes through the magnet 71 and the second support member 62. The abutting member 80 may be movably disposed between the first support member 61 and the second support member 62 along the axial direction X. The combination end 22 of the cartridge 20 extends into the second support member 62 to combine with one end of the abutting member 80. Therefore, the abutting member 80 can be driven to be displaced along the axial direction X by applying a force to the cartridge 20 along the axial direction X. Herein, the abutting member 80 has a combination portion 81, and a shape of the combination portion 81 corresponds to a shape of the combination end 22 of the cartridge 20. In this way, the cartridge 20 can be disassembled and replaced based on a requirement.

Referring to FIG. 1, the third elastic member K3 is fastened to the other end of the abutting member 80. Herein, an outer diameter of the third elastic member K2 varies in the axial direction X. In an embodiment, an outer diameter of one end that is of the third elastic member K2 and that is close to the end opening 12 is greater than an outer diameter of the other end of the third elastic member K2.

Further, referring to FIG. 1, the second support member 62 has an end face 621 and a partition 622, the end face 621 is located at one end of the second support member 62, and the partition 622 is located between two ends of the second support member 62. Herein, the magnet 70 abuts against the end face 621. The abutting member 80, the third elastic member K3, the fourth elastic member K4, and the second pressure sensing element 90 are located between the end face 621 and the partition 622. The cartridge 20 passes through the end face 621 to combine with the abutting member 80, and the second pressure sensing element 90 may be fastened to the partition 622. In addition, the second pressure sensing element 90 may be electrically connected to the circuit board 50 by using a conductor. Herein, the circuit board 50 and the first pressure sensing element 40 are located between the partition 622 and the other end of the second support member 62.

Based on this, a user may press the cartridge 20 along the axial direction X in a common writing posture by using the lateral pressure sensing pointer, and virtual handwriting at a correct position can be calculated and displayed by using an electromagnetic exchange effect between the electromagnetic unit 70 in the housing 10 and a digitizer tablet. While the cartridge 20 is pressed, the second pressure sensing element 90 can sense a pen stroke pressure and display a handwriting change of a corresponding pressure while displaying a handwriting position. In addition, a user may also display different marks, for example, marks of a spray gun by pressing the lateral key 30. Styles of marks displayed by applying a pressure to the cartridge 20 and the lateral key 30 may be adjusted or set by using the circuit unit 50, so that the cartridge 20 and the lateral key 30 can provide marks of different styles, for example, marks of a fountain pen, a writing brush, a marker pen, a pencil, a ballpoint pen, or a spray gun. But this is not limited thereto.

Figure 4:
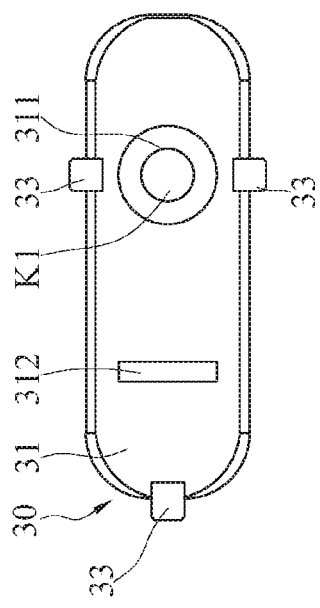
FIG. 4 is a schematic diagram of a lateral key in the embodiment in FIG. 3.

Referring to FIG. 3 and FIG. 4, each of FIG. 3 and FIG. 4 is a schematic diagram of another embodiment of a lateral pressure sensing pointer and a lateral key thereof according to the present application. Structural configurations in the embodiments in FIG. 3 and FIG. 4 are approximately the same as those in the embodiments in FIG. 1 and FIG. 2, and are not described in detail. The following describes only differences.

Referring to FIG. 3, in this embodiment, the first pressure sensing element 40 is a thin-film pressure sensing element. Herein, the first pressure sensing element 40 is fastened to an outer surface that is of the first support member 61 and that faces the lateral key 30. Further, the first thin-film pressure sensing element 40 has a small volume and is disposed on the outer surface of the first support member 61. Therefore, the second elastic member K2 between the first support member 61 and the lateral key 30 may also be correspondingly changed to an elastomer having a small thickness to facilitate space use configuration, but is not limited thereto.

Referring to FIG. 3, in an embodiment, the slip-proof protruding portion 322 is further disposed on the outer surface 32 of the lateral key 30, the slip-proof the protruding portion 322 protrudes from the outer surface 32, and an outline of the slip-proof protruding portion 322 may be a circle, an oval, a triangle, or any other shape. The outer surface 32 of the lateral key 30 becomes a non-smooth surface to provide a slip-proof effect when a user presses the lateral key 30, to improve use operability.

Referring to FIG. 4, in this embodiment, the stoppers 33 of the lateral key 30 may alternatively be disposed at positions of two opposite short lateral sides, and a stopper 33 is also disposed at one end of a long side. In this way, the lateral key 30 can be indeed prevented from dislocating from the lateral opening 13 by three-point positioning. An objective that the lateral key 30 controls to generate a virtual mark can also be achieved.

Figure 5:
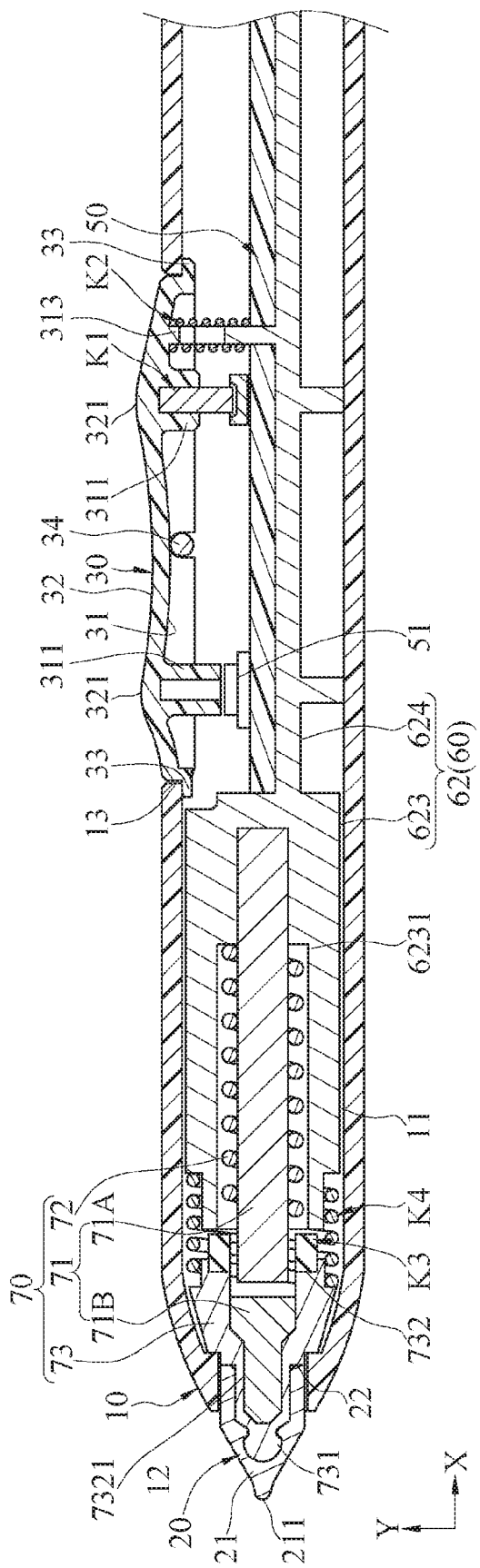
FIG. 5 is a schematic diagram of still another embodiment of a lateral pressure sensing pointer according to the present invention.

Referring to FIG. 5, FIG. 5 is a schematic diagram of another embodiment of a lateral pressure sensing pointer according to the present application. In the lateral pressure sensing pointer shown in FIG. 5, a pressure is also applied to the first pressure sensing element 40 by using the lateral key 30 on the housing 10 to sense a control pressure to display a virtual mark. A difference from the foregoing embodiment lies in a form of the lateral key 30, a form of the inner fastening unit 60, a form of the electromagnetic unit 70, and a configuration of the cartridge 20. The following describes the foregoing difference.

Referring to FIG. 5, in this embodiment, the outer surface 32 of the lateral key 30 has two cone structures and two vertices 321, and the two vertices 321 are symmetrically distributed on the long side of the lateral key 30. Herein, protruding bases 311 are disposed at both positions that are on the inner surface 31 of the lateral key 30 and that correspond to the two vertices 321, and the first elastic member K1 is inserted into one of the protruding bases 311.

Referring to FIG. 5, in addition, stoppers 33 are also disposed at two ends of the long side of the lateral key 30, and the lateral key 30 is pivotally connected to the housing 10 in the middle of the two ends of the long side by using a pivotal element 34. In this way, the lateral key 30 may use the pivotal element 34 as a pivot center so that the two ends of the long side pivot relative to each other. In this way, positions corresponding to the two vertices 321 may be used as key configurations of different functions respectively.

Referring to FIG. 5, specifically, in this embodiment, positions for disposing the first elastic member K1 and the first pressure sensing element 40 in the axial direction X correspond to one vertex 321 of the lateral key 30. The circuit unit 50 may further have a triggering portion 51, and a position of the triggering portion 51 corresponds to a position of the other vertex 321 of the lateral key 30. In this way, the protruding base 311 at a position corresponding to the other vertex 321 on the lateral key 30 can be directly in contact with and control the triggering portion 51. The triggering portion 51 may be used to trigger switching of another function or a switch by setting the circuit unit 50. In this way, function extension of a lateral operation can be provided by changing a form of the lateral key 30.

Besides, pressure sensing elements may also be disposed at both positions of the two vertices 321 corresponding to the lateral key 30 on the housing 10, to sense operation pressures at the positions of the two vertices 321 of the lateral key 30. Certainly, positions and a quantity of pressure sensing elements in the foregoing embodiments are only examples for description, and are not limited in the present invention. When there is another use requirement, the quantity of pressure sensing elements may also be increased, and the pressure sensing elements may be disposed at different positions (for example, a rear end) as extension of another function. In addition, when function extension is required, alternatively, an electromagnetic unit may be additionally disposed correspondingly to facilitate availability of an electromagnetic sensing function.

Referring to FIG. 5, in this embodiment, the lateral key 30 abuts against the second elastic member K2, so that the lateral key 30 can restore an original shape after being pressed. Specifically, the second elastic member K2 is located between the first elastic member K1 and the neighboring stopper 33. Herein, a positioning rod 313 is further disposed on the inner surface 31 of the lateral key 30, and the second elastic member K2 can be sleeved over the positioning rod 313 to stabilize a position of the positioning rod 313.

Referring to FIG. 5, in addition, in this embodiment, the inner fastening unit 60 includes only the second support member 62. Herein, the second support member 62 has a sleeving tube 623 and a support base 624, an open locating slot 6231 is included at one end of the sleeving tube 623, and the support base 624 is engaged with the other end of the sleeving tube 623. Herein, the circuit unit 50 is fastened to the support base 624.

Further, referring to FIG. 5, the magnet 71 of the electromagnetic unit 70 includes a first magnet 71A and a second magnet 71B. In this embodiment, an electromagnetic signal is changed by changing relative distances between the first the magnet 71A and the second the magnet 71B and the coil 72. Herein, the first magnet 71A is a solid rod structure, and the electromagnetic unit 70 further includes a protection member 73. Specifically, the coil 72 is wound around the first magnet 71A, and the coil 72 and the first magnet 71A are accommodated in the locating slot 6231 of the sleeving tube 623. The protection member 73 wraps outside the second magnet 71B. The protection member 73 is made of a soft material so that when the lateral pressure sensing pointer is under an impact in the axial direction X, the protection member 73 buffers a borne force to protect the second magnet 71B and increase a service life of the second magnet 71B.

The third elastic member K3 and the fourth elastic member K4 can compress and elastically restore a position along the axial direction X. The third elastic member K3 is disposed between the protection member 73 and the sleeving tube 623, so that the second magnet 71B and the first magnet 71A maintain a particular distance in a normal state and can provide a representation of a pressure gradient of the cartridge 20. The fourth elastic member K4 is further disposed between the protection member 73 and the sleeving tube 623 to provide, along the axial direction X, an elastic force for restoring the protection member 73 to an original shape.

Referring to FIG. 5, the third elastic member K3 may be a block, a sheet, or a spring made of an elastic material. The elastic material may be silica gel or rubber, but is not limited thereto. In this embodiment, the third elastic member K3 is a rubber block and the fourth elastic member K4 is a circular spring, but this is not limited thereto. Herein, a position of the third elastic member K3 falls within a range of winding of the fourth elastic member K4. In addition, a compression rate of the fourth elastic member K4 is greater than that of the third elastic member K3, to ensure that when the third elastic member K3 is compressed to a limit, the fourth elastic member K4 can still push the protection member 73 to restore an original shape.

Referring to FIG. 5, in this embodiment, the protection member 73 has a combination end 731 and a sleeving end 732, and an outer diameter of the combination end 731 is less than that of the sleeving end 732. An outer diameter change from the sleeving end 732 to the combination end 731 is a tapered change. In addition, the sleeving end 732 of the protection member 73 has a sleeving groove 7321, and the second magnet 71B is fixedly accommodated in the sleeving groove 7321. Herein, the cartridge 20 becomes a form of a suite. That is, the combination end 22 of the cartridge 20 is a groove. In this way, the cartridge 20 is detachably sleeved over the sleeving end 732 of the protection member 73, so that a user autonomously disassembles and replaces the cartridge 20.

Based on the foregoing, a user may operate the lateral pressure sensing pointer by pressing positions of the two vertices 321 of the lateral key 30. Alternatively, a user may operate the lateral pressure sensing pointer by applying a pressure to the cartridge 20 in the axial direction X. The cartridge 20 drives the second magnet 71B to be displaced by using the protection member 73, and displacement of the second magnet 71B changes a relative distance between the second magnet 71B and the first magnet 71A to change an electromagnetic signal, to calculate and display handwriting controlled by applying a pressure by the cartridge 20.

Figure 6:
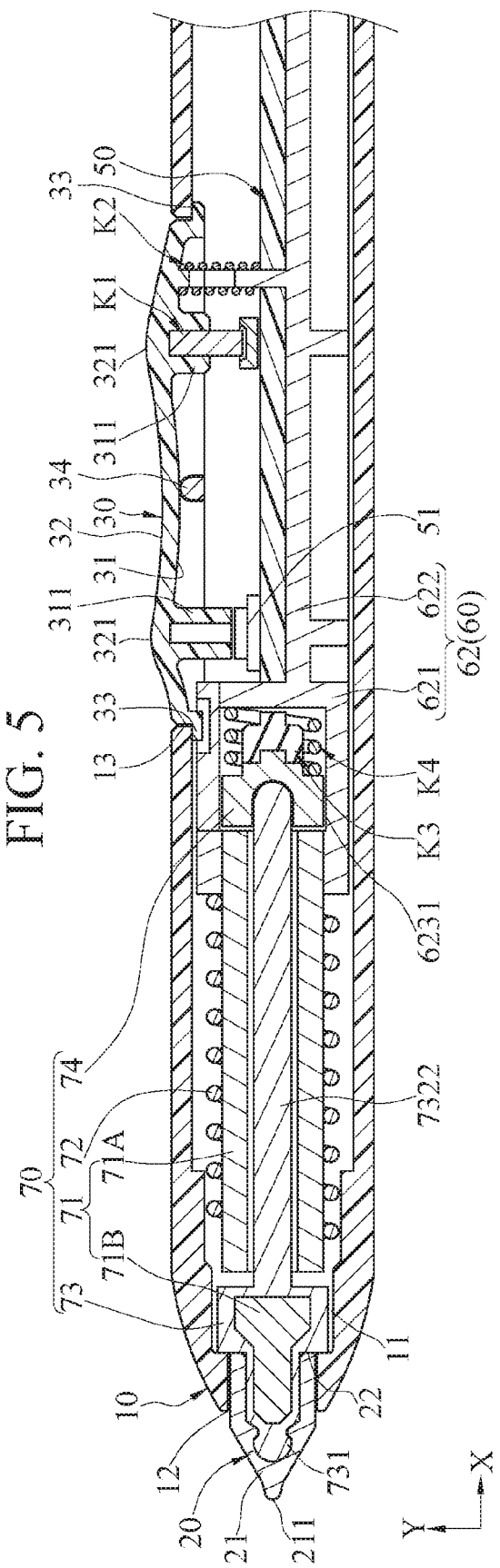
FIG. 6 is a schematic diagram of yet another embodiment of a lateral pressure sensing pointer according to the present invention.

Subsequently, referring to FIG. 6, FIG. 6 is a schematic diagram of another embodiment of a lateral pressure sensing pointer according to the present application. A structural configuration in the embodiment in FIG. 6 is approximately the same as that in the embodiment in FIG. 5, and is not described in detail. The following describes only differences.

Referring to FIG. 6, a difference between this embodiment and the embodiment in FIG. 5 lies in that a structural configuration of providing a pressure gradient of the cartridge 20 in the axial direction X is different. In this embodiment, the first magnet 71A is a hollow rod structure, and the protection member 73 completely wraps the second magnet 71B. In addition, the sleeving end 732 of the protection member 73 has a rod-shaped shaft portion 7322.

Referring to FIG. 6, herein, the electromagnetic unit 70 further includes a shaft portion supporting component 74. The shaft portion supporting component 74, the third elastic member K3, and the fourth elastic member K4 may all be accommodated in the locating slot 6231 of the second support member 62. Specifically, the shaft portion 7322 of the protection member 73 passes through the first magnet 71A and then connects to the shaft portion supporting component 74. The shaft portion supporting component 74 then abuts against one end of the third elastic member K3, and the other end of the third elastic member K3 may abut against the locating slot 6231. The fourth elastic member K4 is sleeved over the periphery of the third elastic member K3, one end of the fourth elastic member K4 abuts against the shaft portion supporting component 74, and the other end of the fourth elastic member K4 abuts against the locating slot 6231.

In this way, a user may operate the lateral pressure sensing pointer by pressing positions of the two vertices 321 of the lateral key 30. Alternatively, a user may operate the lateral pressure sensing pointer by applying a pressure to the cartridge 20 in the axial direction X. When a pressure is applied to the cartridge 20 in the axial direction X, the second magnet 71B can be driven to change relative positions of the second magnet 71B and the first magnet 71A and an electromagnetic signal. Handfeel of a pressure gradient is provided by using the shaft portion supporting component 74 and the third elastic member K3. The fourth elastic member K4 can similarly ensure that the cartridge 20 can restore an original shape after bearing a force, to facilitate use next time.

Figure 7:
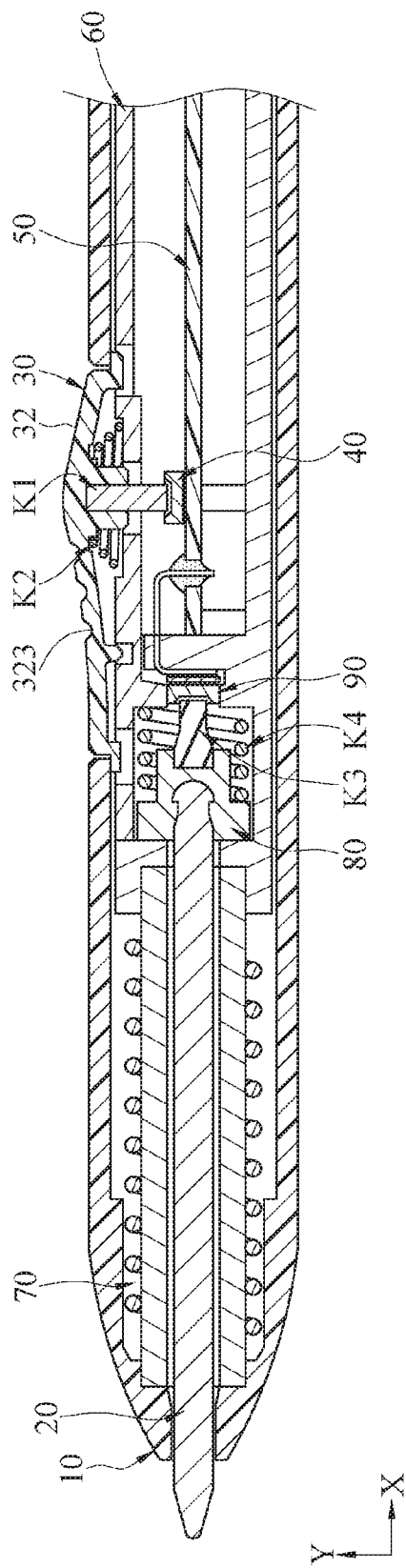
FIG. 7 is a schematic diagram of still yet another embodiment of a lateral pressure sensing pointer according to the present invention.

Referring to FIG. 7, FIG. 7 is a schematic diagram of another embodiment of a lateral pressure sensing pointer and a lateral key thereof according to the present application. A structural configuration in the embodiment in FIG. 7 is approximately the same as those in the embodiments in FIG. 1 and FIG. 2, and is not described in detail. The following describes only differences.

The embodiment in FIG. 7 provides another aspect of the second elastic member K2, and herein, the second elastic member K2 is a conical spring. The lateral key 30 can also be pushed to restore an original shape by disposing the second elastic member K2 in the form of a conical spring.

In addition, in the embodiment in FIG. 7, a recessed slip-proof portion 323 may alternatively be disposed on the outer surface 32 of the lateral key 30. The recessed slip-proof portion 323 is recessed downward relative to the outer surface 32, and an outline of the recessed slip-proof portion 323 may be a circle, an oval, a triangle, or any other shape. The outer surface 32 of the lateral key 30 becomes a non-smooth surface to provide a slip-proof effect when a user presses the lateral key 30, to improve use operability.

Figure 8:
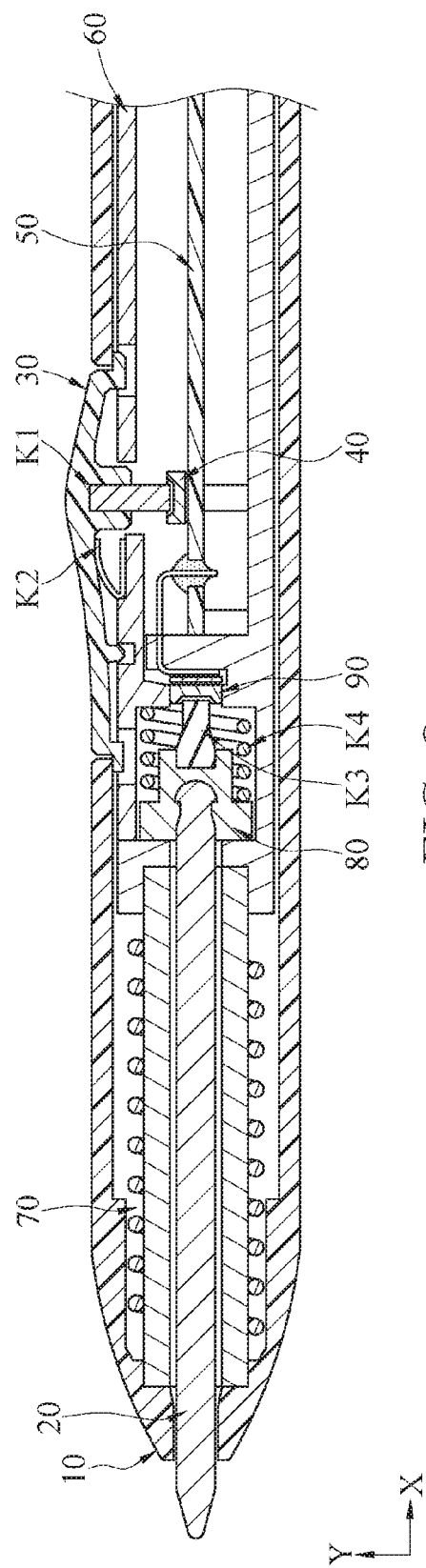
FIG. 8 is a schematic diagram of a still yet further embodiment of a lateral pressure sensing pointer according to the present invention.

Referring to FIG. 8, FIG. 8 is a schematic diagram of another embodiment of a lateral pressure sensing pointer and a lateral key thereof according to the present application. A structural configuration in the embodiment in FIG. 8 is approximately the same as those in the embodiments in FIG. 3 and FIG. 4, and is not described in detail. The following describes only differences.

In the embodiment in FIG. 8, the second elastic member K2 is an elastomer, and the second elastic member K2 in the aspect of the elastomer may also cooperate with the implementation aspect of using the first pressure sensing element 40 shown in FIG. 3 and FIG. 4. That is, it is not limited that the second elastic member K2 in the form of the elastomer needs to be used in cooperation with a thin-film pressure sensing element. Further, the thin-film pressure sensing element may alternatively be used in cooperation with the second elastic member K2 that is not in the form of an elastomer.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A lateral pressure sensing pointer, comprising:
a housing, being a hollow structure that extends a length along an axial direction, wherein the housing has an end opening, a lateral opening, and an accommodation space, and the end opening and the lateral opening are respectively in communication with the accommodation space;
a cartridge, disposed at the end opening;
a lateral key, disposed at the lateral opening and having an inner surface and an outer surface that are opposite to each other, wherein the inner surface faces the accommodation space;
a first elastic member, wherein one end of the first elastic member is combined with the inner surface of the lateral key, and the first elastic member can provide an elastic force along a radial direction perpendicular to the axial direction;
a first pressure sensing element, disposed inside the accommodation space and opposite to the other end of the first elastic member, wherein the first pressure sensing element can sense a pressure applied along the radial direction; and
a second elastic member, abutting against the inner surface of the lateral key and capable of providing an elastic force along the radial direction.

2. The lateral pressure sensing pointer according to claim 1, further comprising: an electromagnetic unit, accommodated in the accommodation space, wherein the electromagnetic unit comprises a magnet and a coil, and the coil is wound outside the magnet.

3. The lateral pressure sensing pointer according to claim 2, further comprising: a second pressure sensing element, disposed in the accommodation space, wherein the cartridge can be displaced along the axial direction, the second pressure sensing element is in a displacement direction of the cartridge, and the second pressure sensing element can sense a pressure applied by the cartridge along the axial direction.

4. The lateral pressure sensing pointer according to claim 3, further comprising: a third elastic member, disposed in the accommodation space and located between the cartridge and the second pressure sensing element, wherein the third elastic member is connected to the cartridge in a linked manner.

5. The lateral pressure sensing pointer according to claim 4, further comprising: an abutting member, connected between the third elastic member and the cartridge.

6. The lateral pressure sensing pointer according to claim 5, further comprising: a fourth elastic member, abutting against the abutting member and capable of providing an elastic force along the axial direction, wherein the fourth elastic member and the third elastic member are located at coaxial positions.

7. The lateral pressure sensing pointer according to claim 1, wherein the first elastic member is silica gel or a rubber body.

8. The lateral pressure sensing pointer according to claim 4, wherein the third elastic member is silica gel or a rubber body.

9. The lateral pressure sensing pointer according to claim 1, wherein the second elastic member is a spring or an elastomer.

10. The lateral pressure sensing pointer according to claim 6, wherein the fourth elastic member is a spring.

11. The lateral pressure sensing pointer according to claim 3, further comprising: a circuit unit, fixedly disposed in the accommodation space, wherein the coil, the first pressure sensing element, and the second pressure sensing element are electrically connected to the circuit unit.

12. The lateral pressure sensing pointer according to claim 11, further comprising: a triggering portion, electrically connected to the circuit unit, wherein a protruding base is further comprised at a position that is on the inner surface of the lateral key and that corresponds to the triggering portion protruding base.

* * * * *